Figures 1, 2, 3, 4:
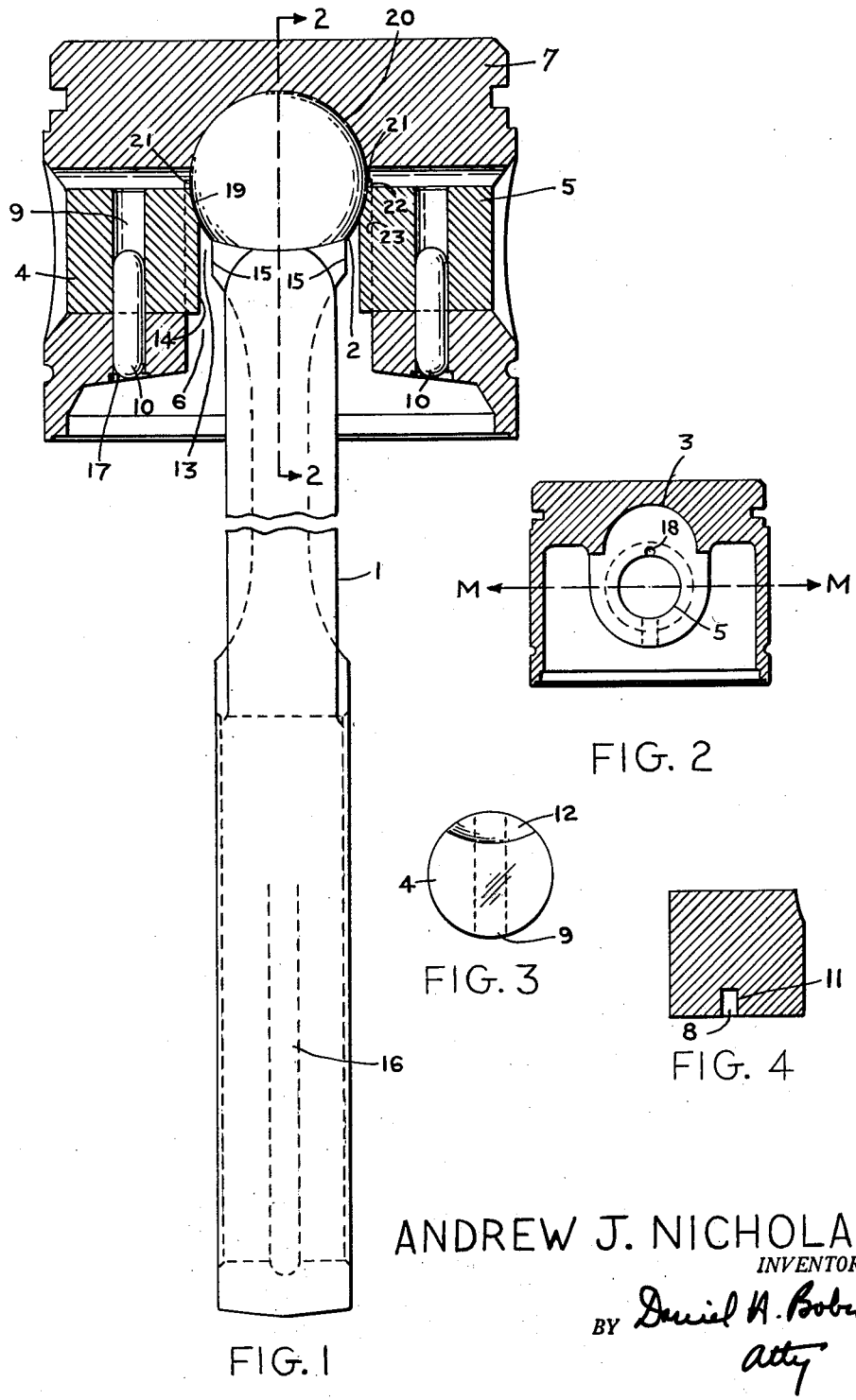

ANDREW J. NICHOLAS
*INVENTOR.*

United States Patent Office 2,818,314
Patented Dec. 31, 1957

2,818,314

SELF ALIGNING CONNECTING ROD AND PISTON ASSEMBLY

Andrew J. Nicholas, Suffield, Conn., assignor to Worthington Corporation, Harrison, N. J., a corporation of Delaware Application November 14, 1956, Serial No. 622,038

8 Claims. (Cl. 309—20)

The present invention relates to a new and improved type of piston and more particularly to self aligning means which retain the connecting rod in the piston.

The self aligning connecting means is particularly adapted to compensate for misalignments that occur in the manufacture of the crankshaft, piston and connecting rod.

Previous connecting devices for pistons and connecting rods, due to the critical requirements of close fits in refrigeration compressors, in order to insure quiet operation, had to be well fitted and aligned. This required considerable machining and constant inspection of the parts. Such forms of assemblies if misaligned, however, would result in an uneven reciprocation of the piston with consequent injury to the cylinder wall.

The present invention overcomes these objectionable features of previous devices for connecting a connecting rod to a piston by providing retaining pins for the rod to compensate for misalignment due to manufacturing errors.

Accordingly, the principal object of the present invention is to provide a self-aligning means having a novel arrangement of retaining the connecting rod in the piston, which automatically compensates for a variety of possible misalignments.

Another object of the present invention is to adapt this piston and connecting rod assembly for use with a practical design of a die cast crankcase and cylinder. The slight misalignments in the crankcase which occur in the die casting process to be fully compensated for by the self aligning connecting means.

These and other objects and advantages of the present invention will be more easily understood from the following detailed description in which:

Figure 1 shows a piston and connecting rod partly in section and showing the self adjusting means of the invention, Figure 2 a section through the piston in Figure 1 taken on line 2—2, Figure 3 an end view of the retaining pin, and Figure 4 a longitudinal section of a modified retaining pin with a kerf.

Figure 1 shows a piston 7 with a cavity 6 and a half spherical bottom 3 machined in the piston to hold a semispherical head 2 of a connecting rod 1 with conventional bearings for the crankcase at the other end.

Cylindrical retaining pins 4 formed from powdered iron or similar material fit into both sides of the cross-bore 5 which opens into the cavity 6 of the piston 7 below the center line of the half spherical bottom. A modification of the pin is shown in Figure 4 with a kerf 8 in place of the hole 9 in which is mounted dowel pin 10 to lock the pin in the piston. In this design the side wall in the kerf provides a slight clearance for the dowel pin allowing the pin to rock slightly in its bore axis as the connecting rod oscillates in the socket with crankshaft rotation. The retaining pins 4 extend into the cavity 6 of the piston and the spherically formed upper portion 12 of the pin 4 abuts the semi-spherical head 2 of the connecting rod 1 in close fit thereby constraining it in the half-spherical bottom 3.

Dowel pins 10 are inserted through hole 17 in the piston and into a hole 9 machined in the retaining pins to lock them into close fit with the semi-spherical head of the connecting rod and retain it in the half spherical cavity.

A hole 18 is cross drilled through the piston to serve as an oil passageway to the bearings surfaces 19 of the retaining pin 4 and ball joint 20 of the piston and connecting rod.

Oil pockets 21 in the form of a partial spherical annulus keep the spherical bearing surfaces wetted with lubricant. The pockets are formed by the top of the retaining pins 4, the semi spherical head of the connecting rod, and the walls 22 of a counter bore 23 adjacent the half spherical bottom of the piston cavity.

The retaining pins 4 permit the oscillation of the connecting rod 1 in the plane M—M however, it is prevented from rotating beyond the boundary of the slot 13 formed by the flat lower surface 14 of the retaining pins 4 and shoulders 15 of the connecting rod.

The space 13 between the shoulders 15 and flats 14 is adequate to compensate for misalignments of the retaining pin cross bore 5, crankshaft centerline, and crankcase cylinder centerlines. This space 13 is also sufficient to prevent the connecting rod from being turned 180° in the ball socket when assembled and it maintains the oil groove 16 in the lower end of the rod properly related to the shaft and its rotation in assembly.

It will be understood that this invention is not limited to the specific construction or arrangement of parts shown, but that they may be widely modified within the invention defined by the claims.

What is claimed is:

1. Self aligning connecting means for connecting a piston to a connecting rod comprising a piston having a cavity therein, said cavity having a semi-spherical bottom, a counterbore adjacent said semi-spherical bottom of said cavity, a connecting rod having a semi-spherical head disposed in said semi-spherical bottom of said cavity, retaining pins extending into said cavity below the centerline of said semi-spherical bottom of said cavity from opposite sides of said piston and in alignment with each other, said retaining pins having an upper spherical portion mounted in close fit with said semi-spherical head and spaced adjacent shank of said connecting rod to permit movement of shank in direction of said pins thereby compensating for misalignment of said retaining pins, and dowel pins disposed in said piston adapted to register with said retaining pins to lock said retaining pins in operative position.

2. In the self aligning connecting means claimed in claim 1 wherein a pocket is formed by the retaining pins, the cavity walls adjacent said counterbore, and the semispherical head of the connecting rod for lubricating the semi-spherical head when in operative position.

3. Self aligning connecting means for connecting a piston to a connecting rod comprising a piston having a cavity therein, said cavity having a semi-spherical bottom, a counterbore adjacent said semi-spherical bottom of said cavity, means extending into said cavity below the centerline of said semi-spherical bottom of said cavity from opposite sides and in alignment with each other for retaining said connecting rod in said piston, dowel pins disposed in said piston adapted to lock said means in operative position, said means, said cavity walls adjacent said counterbore and said semi-spherical head form a pocket to collect lubricant and a passageway in said piston to permit the flow of lubricant to said semi-spherical head.

4. Self aligning connecting means for connecting a piston to a connecting rod comprising a piston having a cavity therein, said cavity having a semi-spherical bottom, a counterbore adjacent said semi-spherical bottom, a connecting rod having a semi-spherical head disposed in said semi-spherical bottom of said cavity, retaining pins for said connecting rod having an upper spherical portion abutting said semi-spherical head and spaced adjacent shank of said connecting rod to permit movement of said shank in direction of said pins and extending into said cavity below the centerline of said spherical bottom of said cavity from opposite sides and in alignment with each other, whereby pockets are formed by the cylinder walls adjacent said counterbore, the top of said retaining pins and the semi-spherical head of said connecting rod for collecting lubricant supplied from passageways in said piston to said semi-spherical head and dowel pins disposed in said piston adapted to register with said retaining pins to lock said retaining pins in operative position.

5. Self aligning connecting means for connecting a piston to a connecting rod comprising, a piston having a cavity therein, said cavity having a semi-spherical bottom, a connecting rod having a semi-spherical head disposed in said semi-spherical bottom of said cavity, retaining pins disposed in opposite sides of said piston and in alignment with each other for retaining said connecting rod in said piston, and dowel pins disposed in said piston adapted to register with said pins to lock said pins in operative position.

6. Self aligning connecting means for connecting a piston to a connecting rod comprising, a piston having a cavity therein, said cavity having a semi-spherical bottom, a connecting rod having a semi-spherical head disposed in said semi-spherical bottom of said cavity, retaining pins disposed in opposite sides of said piston and in alignment with each other for retaining said semi-spherical head in said semi-spherical bottom of said cavity, dowels disposed in said piston adapted to register with said means to lock said means in operative position and means in said piston communicating with said semi-spherical cavity allowing flow of lubricant to said semi-spherical head.

7. Self aligning connecting means for connecting a piston to a connecting rod comprising, a piston having a cavity therein, said cavity having a semi-spherical bottom, a connecting rod having a semi-spherical head disposed in said semi-spherical bottom of said cavity, retaining pins disposed in opposite sides of said piston and in alignment with each other for retaining said connecting rod in said piston, said retaining pins having an upper spherical portion mounted in close fit with said semi-spherical head and spaced adjacent the shank of said connecting rod to permit movement of said shank in said pins thereby compensating for misalignment of said retaining pins, and dowel pins disposed in said piston adapted to register with said retaining pins to lock said retaining pins in operative position.

8. In the combination claimed in claim 7 wherein the piston is provided with means communicating with said semi-spherical cavity allowing the flow of lubricant to said semi-spherical head.

References Cited in the file of this patent
UNITED STATES PATENTS

| | | |
|---|---|---|
| 1,419,736 | Johnston | June 13, 1922 |
| 1,722,561 | Coutts | July 30, 1929 |

FOREIGN PATENTS

| | | |
|---|---|---|
| 304,526 | Great Britain | June 24, 1929 |